United States Patent

Bruening

Patent Number: 6,033,615
Date of Patent: Mar. 7, 2000

[54] METHOD FOR PRODUCING A NOZZLE CARTRIDGE

[75] Inventor: Werner Bruening, Engelskirchen-Ruenderoth, Germany

[73] Assignee: Alfred Fischbach KG Kunststoff-Spritzgusswerk, Engelskirchen, Germany

[21] Appl. No.: 09/003,133

[22] Filed: Jan. 6, 1998

[30] Foreign Application Priority Data

Jan. 30, 1997 [DE] Germany ............................ 197 03 316

[51] Int. Cl.⁷ .................................................. B29C 45/36
[52] U.S. Cl. ....................... 264/328.7; 425/577; 425/468; 425/575
[58] Field of Search ............................. 264/328.1, 328.7, 264/328.11; 425/577, 468, 575; 222/325, 326, 95, 107

[56] References Cited

U.S. PATENT DOCUMENTS

| | | | |
|---|---|---|---|
| 3,737,272 | 6/1973 | Segmuller | 264/328.7 |
| 3,767,156 | 10/1973 | Sullivan et al. | 425/577 |
| 4,733,801 | 3/1988 | Scammell | 264/328.7 |
| 4,983,344 | 1/1991 | Brown | 264/328.7 |
| 5,174,941 | 12/1992 | Sorenson | 264/328.7 |
| 5,240,397 | 8/1993 | Fay et al. | 264/328.11 |

FOREIGN PATENT DOCUMENTS

| | | | |
|---|---|---|---|
| 52-57257 | 5/1977 | Japan | 264/328.7 |
| 61-239923 | 10/1986 | Japan | 264/328.7 |

*Primary Examiner*—Jill L. Heitbrink
*Attorney, Agent, or Firm*—Diller, Ramik & Wight

[57] ABSTRACT

In the production of a nozzle cartridge with a nozzle formed thereon in a hollow mold, in which a core (26) is located, a centering of the core (26) occurs in an injection phase by means of webs (40) provided on the hollow mold, with a conical centering surface (39) of the core (26) abutting against them. In a subsequent supplementary filling phase, the core (26) or an interior core (28) is withdrawn, the melt flowing over the webs (40) and forming a closed wall in the area of the nozzle base.

21 Claims, 3 Drawing Sheets

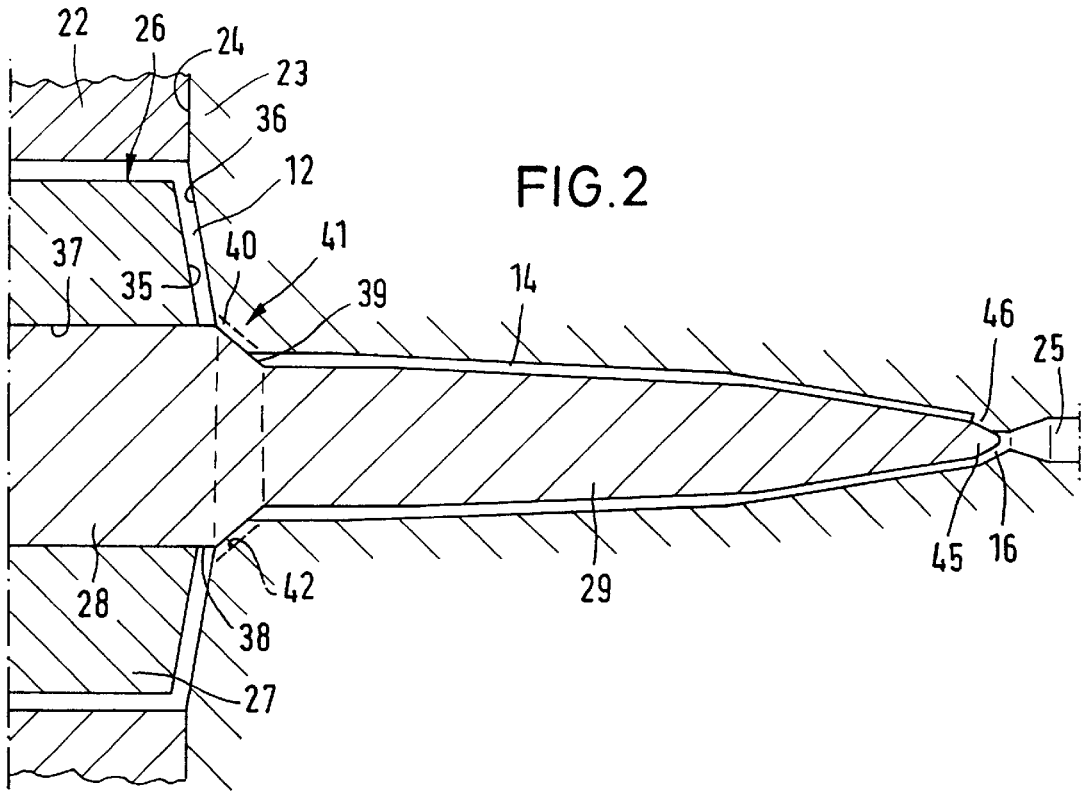
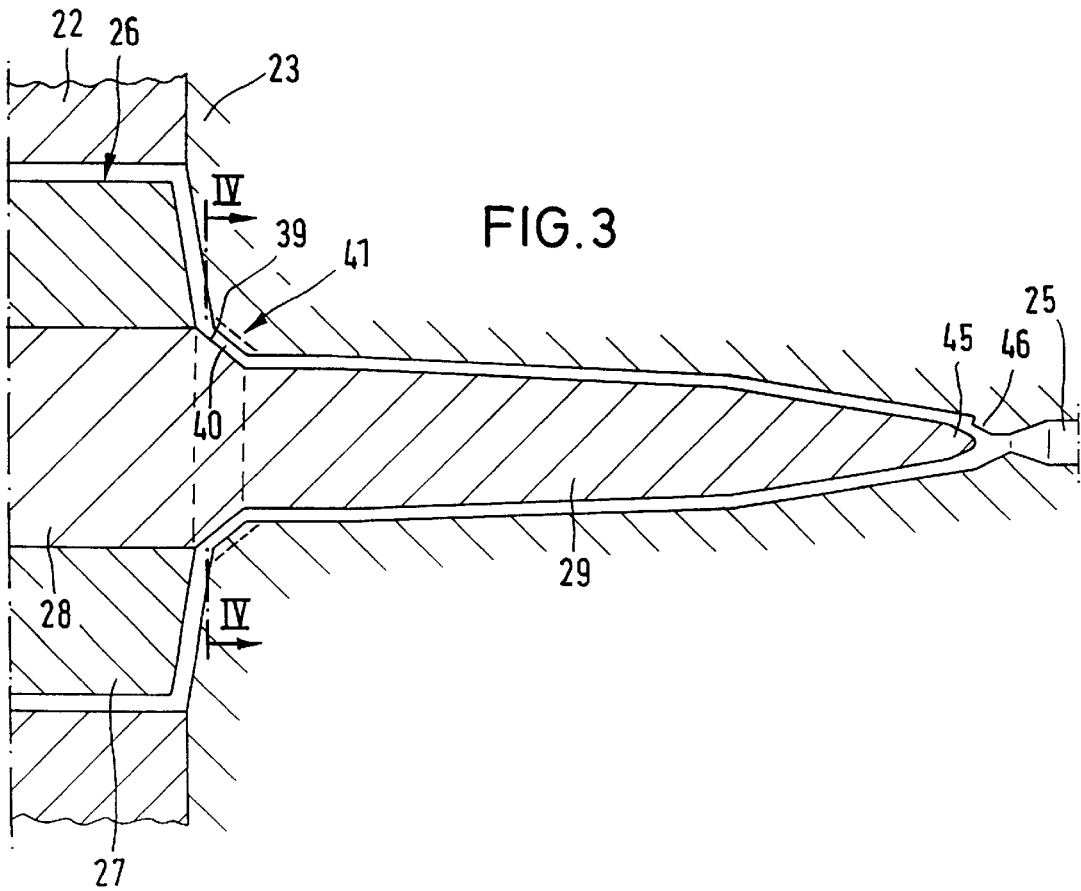

METHOD FOR PRODUCING A NOZZLE CARTRIDGE

BACKGROUND OF THE INVENTION

The invention refers to a method for producing a nozzle cartridge which can be used as a container for pressing out flowable or thixotrop materials, as well as a device for producing a nozzle cartridge, and finally also a nozzle cartridge.

BACKGROUND OF THE INVENTION

The cartridges used for pressing out flowable or thixotrop materials, e. g. sealing materials, have a cylindrical cartridge body limited at one end by an annular shoulder having an outlet connection projecting therefrom. As a separate part, a nozzle is screwed on the outlet connection provided with an external thread. There are also known nozzle cartridges in which the nozzle is an integral part of the cartridge and is produced integrally therewith. Such nozzle cartridges have the advantage that it is not necessary to mold a complicated thread.

The production of nozzle cartridges takes place by injecting a melt into a mold consisting of an exterior hollow mold and an interior core. In this process, the molten plastic is injected into the mold at a very high pressure, and the thermoplastic then becomes solid by cooling in the mold. A special problem is keeping the core centered in the mold. The core, which does not only fill out the interior of the future cartridge body but also the interior of the nozzle, extends from a core support like a cantilever and projects into the hollow mold. An even wall thickness of the cartridge is only achieved if the core remains exactly centered in the hollow mold. With the applied pressures and the resulting high forces, it is extremely difficult to maintain the central position of the core. A deviation of the core from its central position would result in an uneven distribution of wall thickness of the cartridge.

During production of cartridges comprising a threaded connection, the core is supported at the end of the threaded connection, and the melt is injected into the mold from this end. However, in the case of nozzle cartridges, because of the long structural shape of the nozzle and because of the small diameter at the end of the nozzle, it would not be sufficient to support the core at the end of the nozzle to center the core in an exact manner during the injection process. Therefore, it has been tried to inject nozzle cartridges in one piece by providing two injection locations in the area of the annular shoulder. However, this is not a satisfactory solution to the problem of centering.

SUMMARY OF THE INVENTION

The invention is based on the objective to provide a method for producing a nozzle cartridge by injecting a melt into a mold, in which an exact centering of the mold core is ensured.

The invention proposes a method for producing a nozzle cartridge comprising a cylindrical cartridge body ending in an annular shoulder and a tapering nozzle projecting from the annular shoulder, by injecting a melt into a mold comprising a hollow mold and a core, the core or a part thereof being supported, in a first injection phase, on the hollow mold in a centering area at the transition between annular shoulder and nozzle by conically centered webs and the core, or a part thereof, being supported, in a filling-up phase, at a distance from the centering area to fill up the areas kept free by the webs during the injection phase.

In the method according to the invention, the core (or a part thereof) is pressed in the transitional area between the annular shoulder and the nozzle against centering webs of the hollow mold, and thereby the core is centered relatively to the hollow mold.

From this transitional area, the nozzle part of the core projects forward. Thus, the area in which the core is supported is not located at the end of the core but in the area of the annular shoulder. At this location, the diameter of the core is relatively large, so that an exact centering by simple measures is possible. The core is supported to be centered by appropriate webs provided either at the core or at the hollow mold in the area of support. The melt coming from the nozzle passes between these webs towards the cartridge body. Initially, the webs cause interruptions to be produced at the annular shoulder of the cartridge. Therefore, it is only in the injection phase that the webs are held against a centering surface. Then the counterpressure supporting the core during the injection phase is terminated so that the core withdraws a short distance under the pressure of the melt and the webs obtain a distance from the centering surface. In this process, the annular shoulder of the cartridge is completed by further advancing the melt due to the pressure of the melt during a supplementary filling phase.

By the method according to the invention, it is achieved to produce a nozzle cartridge by centering the core in particular in the area of the annular shoulder (base of the nozzle) so that a complete centering exclusively at the extreme end of the cartridge is avoided.

The invention further refers to a device for producing a nozzle cartridge. In this device, the core consists of two parts. Namely, it consists of an interior core for the nozzle portion and an exterior core for the cartridge body. The interior core is controlled such that it rests against the hollow mold during the injection phase in a central area at the transition between annular shoulder and nozzle and maintains a distance from the hollow mold during a supplementary filling phase. Thus, in this context, the position of the exterior core remains unchanged during the injection phase. The interior core serves to center the exterior core and as a shaping tool for the nozzle area. The centering core is axially displaceable in the exterior core to be able to assume different positions.

Finally, the invention also refers to a nozzle cartridge with a cartridge body ending in an annular shoulder and a tapering closed nozzle projecting from the annular shoulder. According to the invention, a conical nozzle base reinforced by ribs is arranged in the transition portion between the annular shoulder and the nozzle. The nozzle base forms a conical transition portion with a sufficient thickness to form a steam lock for a sufficient storage time of the future charge. The ribs reinforce the transition, keeping the nozzle in position.

BRIEF DESCRIPTION OF THE DRAWINGS

An embodiment of the invention will now be described with reference to the accompanying drawings, wherein FIG. 2 shows an enlarged segment of FIG. 1, FIG. 3 shows the segment of FIG. 2 during the supplementary filling phase.

DESCRIPTION OF PREFERRED EMBODIMENTS

Figure 5:
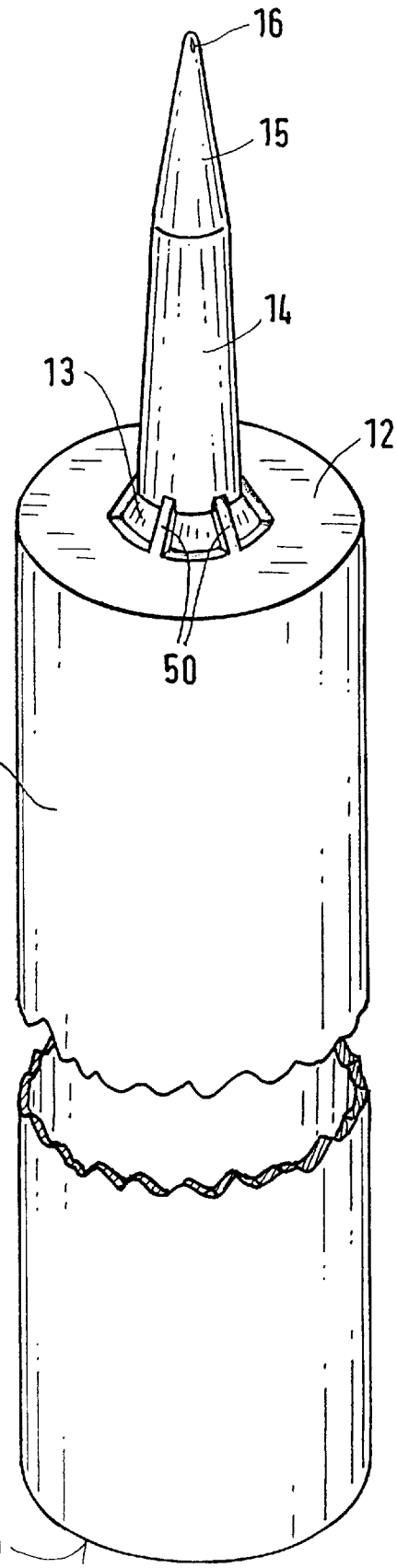
FIG. 5 shows a perspective representation of the nozzle cartridge produced.

Before the production method is explained, there at first is given a description of the nozzle cartridge represented in FIG. 5. The nozzle cartridge comprises an elongated tubular cylindrical cartridge body 10 open at one end 11, while the opposite end is limited by an end wall in the shape of an annular shoulder 12. The annular shoulder 12 surrounds a conical nozzle base 13 having a wall surface inclined by about 40°. The annular nozzle base 13 borders on the nozzle 14 consisting of an elongated, slightly conically tapering tube. The nozzle 14 ends in a nozzle tip 15 where it can be cut off to expose the nozzle opening with a choosable diameter. The nozzle tip 15 ends in a tip portion 16. The entire cartridge consists of an integral part of plastic.

Figure 1:
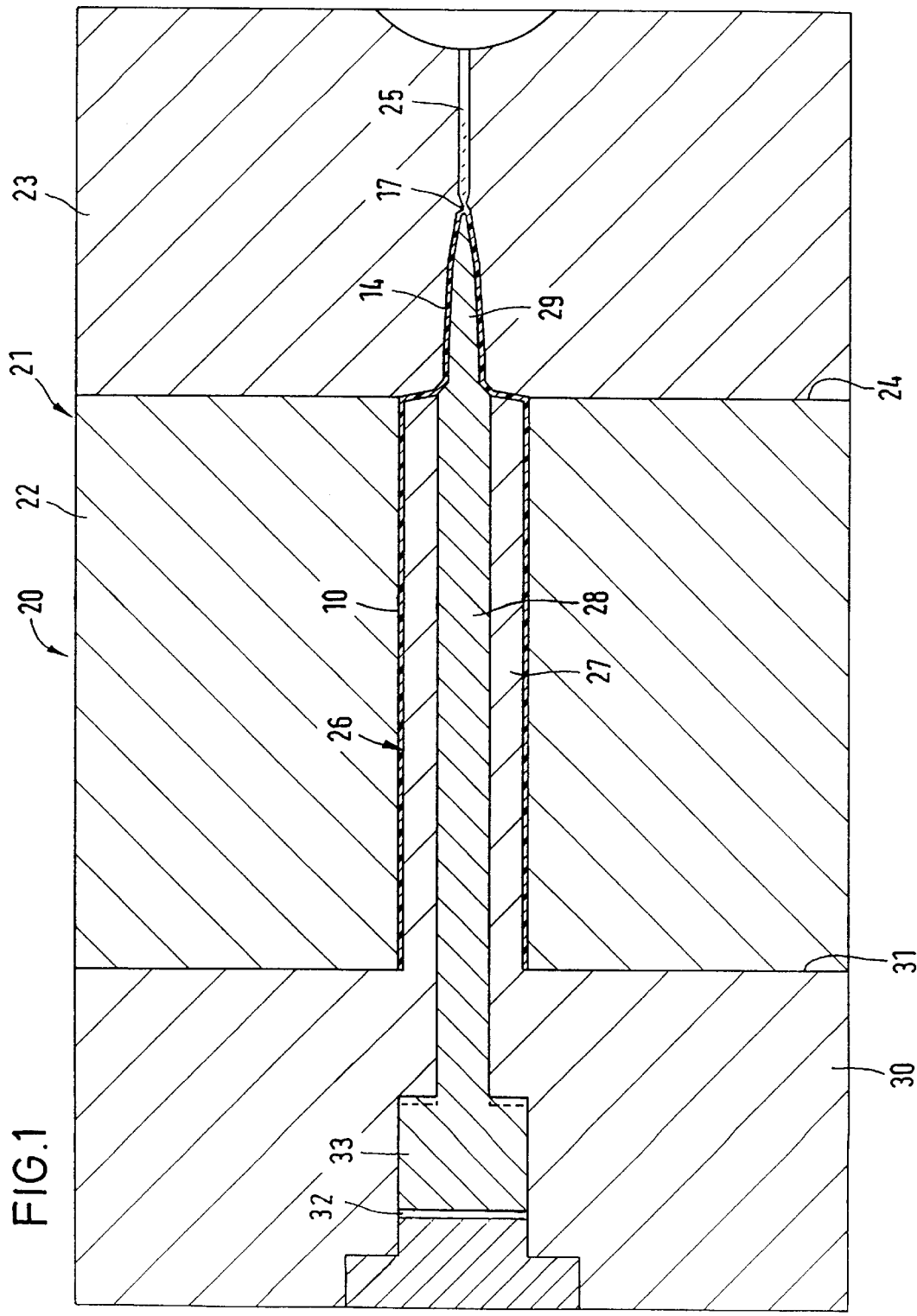
FIG. 1 shows a schematic longitudinal section of the mold during the injection phase.

To produce the nozzle cartridge, the mold 20 represented in FIG. 1 is used. This mold 20 comprises a hollow mold 21 consisting of a main portion 22 and a head portion 23. Main portion 22 and head portion 23 abut against each other along a separation surface 24. The two portions 22 and 23 can be moved apart axially to eject the finished nozzle cartridge. The head portion 23 comprises a supply channel 25 axially extending towards the tip portion 17 and through which the melt is introduced to the mold cavity at a very high pressure to flow from the tip portion 17 to the rear end 11 of the cartridge body.

The mold 20 further contains a core 26 consisting of a tubular exterior core 27 and an interior core 28 extending through the exterior core. The exterior core 27 serves to shape the interior surface of the cartridge body 10 and the interior core 28 serves to form the interior surface of the nozzle 14. The interior core 28 therefore comprises an extension 29 axially projecting from the exterior core 27 and shaping the nozzle 14. Furthermore, the interior core 28 serves to center the exterior core 27.

The exterior core 27 projects from a core support 30 pressed against the rear end of mold portion 22, the separation line being referred to as 31. The core support 30 can be pulled out of the hollow mold 21 together with the core 26. It comprises a cylindrical space 32 in which a piston 33 connected to the interior core 28 is axially displaceable. The piston 33 is controlled as a function of the injection process. In FIG. 1, the piston 33 is represented in its advanced position in solid lines, while it is represented in its retracted position in dotted lines. The distance between the two positions can amount to about 2–3 mm.

As can be seen from FIG. 2, the interior surface of the annular shoulder 12 is formed by a slightly conical frontal surface 35 of the exterior core 27, while the exterior core of the annular shoulder is formed by a slightly conical frontal surface 36 of the head piece 23 of the hollow mold. The frontal surfaces 35, 36 are parallel towards each other. The interior core 28 extends fittingly in a bore of the exterior core 27. In the advanced state according to FIG. 2, a part 38 of the cylindrical longitudinal section of the interior core 28 projects beyond the frontal surface 35. This part 38 borders on a conical centering surface 39 merging into the extension 29. The cone angle of the centering surface 39 amounts to about 40°.

Figure 4:
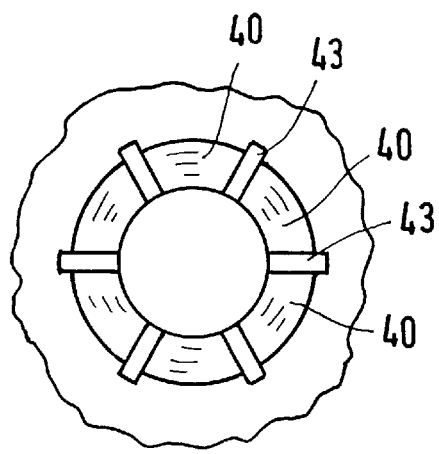
FIG. 4 shows a segment along the line IV—IV of FIG. 3.

In the injection phase, which is represented in FIG. 2, the centering surface 39 of the interior core 28 rests against conically arranged radial webs 40 projecting in a centering area 41 at the place of transition between annular shoulder 12 and nozzle 14 as extensions from an interior cone surface 42 of the hollow mold. The interior cone surface 42 and the abutment surfaces of the webs 40 run parallel to the centering surface 39. As can be seen from FIG. 4, there is a channel 43 between any two webs 40 through which the melt gets from the mold cavity of the nozzle 14 into the mold cavity of the annular shoulder 12.

While the piston 33 is hydraulically held in its advanced position, the melt is injected at a very high pressure of 1500 to 2000 bars within a very short time (less than 0.4 sec.) from the supply channel 25 into the mold cavity of the nozzle cartridge. In this process, the melt at first gets centrically into the mold cavity for forming the tip portion 16 and then continues to flow in the annular space for forming the nozzle 14. For centering the tip 45 of the extension 29, there are provided on the head piece 23 three webs 46 projecting radially into the mold cavity, the tip 45 abutting against the webs in the injection phase. In this manner, the extension 29 is centered both at its base in the centering area 41 and at its tip 45. In this process, the melt flows past the webs 40 and 46.

After the melt has arrived at the rear end of the cartridge body 10 and fills the entire mold cavity, the piston 33 is relieved so that it withdraws together with the interior core 28 under the pressure of the amorphous melt. In this phase, the injection is already finished, and the supplementary filling phase takes place, during which the melt continues to flow into the mold. Now the interior core is no longer centered by the centering surfaces, but by the plastic already solidified in part. This state is represented in FIG. 3. The centering surface 39 now is at a distance from the webs 40 and the tip 45 also is at a distance from the webs 46. In the supplementary filling phase, additional melt is injected through the supply channel 25 before the melt injected in the first injection phase is solidified completely. That is why melt now gets under the webs 40 and 46, thereby closing the wall is closed in the area of the nozzle base 13 and in the tip portion 16.

After the supplementary filling phase has been finished and the melt has cooled off in the cooled mold 20, the mold portions 22 and 23 are moved apart so that the nozzle 14 is exposed at the outside. Then the core 26 is pulled out of the mold 20 together with the nozzle cartridge, and the finished nozzle cartridge can be taken off the core.

Those locations which were kept free by the webs 40 during the injection phase form ribs 50 (FIG. 5) on the finished nozzle cartridge, which are raised on the conical nozzle base 13. The conical nozzle base 13 consists of that surface which was formed in the supplementary filling phase by injecting melt behind the ribs 50.

I claim:

1. A method of manufacturing a nozzle cartridge defined by a cylindrical body (10) ending at an annular shoulder (12) defining a transition area merging with a nozzle (14) tapering from the annular shoulder (12) toward a nozzle tip (15) comprising the steps of providing a mold (20) including a female cavity and a male core cooperatively defining an injection cavity corresponding to the configuration of the nozzle cartridge, injecting hot melt into the injection cavity while (a) centering a tip (45) of the male core (29) against a centering portion (46) of the female cavity and while (b) centering an annular shoulder (39) of the male core (29) against a centering portion (40) of the female cavity to substantially fill the injection cavity, and terminating the centering of the tip (45) and the annular shoulder (39) to effect total infusion of the injected hot melt into substantially the entirety of the injection cavity including areas created during centering termination.

2. The method as defined in claim 1 wherein the terminating step is performed by effecting relative axial movement between the female cavity and the male core.

3. The method as defined in claim 1 wherein the terminating step is performed by effecting relative axial movement between the female cavity and the male core by axially moving the male core.

4. A method of manufacturing a nozzle cartridge defined by a cylindrical body (10) ending at an annular shoulder (12) defining a transition area merging with a nozzle (14) tapering from the annular shoulder (12) toward a nozzle tip (15) comprising the steps of provided a mold (20) including a female cavity and a male core cooperatively defining an injection cavity corresponding to the configuration of the nozzle cartridge, injecting hot melt into the injection cavity at a tip cavity portion of the injection cavity while centering at least one of (a) a tip (45) of the male core (29) against a centering portion (46) of the female cavity and (b) an annular shoulder (39) of the male core (29) against a centering portion (40) of the female cavity to substantially fill the injection cavity, and terminating the at least one centering of the tip (45) and the annular shoulder (39) to effect total infusion of the injected hot melt into substantially the entirety of the injection cavity including areas created during centering termination.

5. The method as defined in claim 4 wherein the terminating step is performed by effecting relative axial movement between the female cavity and the male core.

6. The method as defined in claim 4 wherein the terminating step is performed by effecting relative axial movement between the female cavity and the male core by axially moving the male core.

7. The method as defined in claim 4 wherein the hot melt is injected in a flow direction from the tip cavity portion toward the annular shoulder.

8. The method as defined in claim 5 wherein the hot melt is injected in a flow direction from the tip cavity portion toward the annular shoulder.

9. The method as defined in claim 6 wherein the hot melt is injected in a flow direction from the tip cavity portion toward the annular shoulder.

10. Apparatus for manufacturing a nozzle cartridge defined by a cylindrical body (10) ending at an annular shoulder (12) defining a transition area merging with a nozzle (14) tapering from the annular shoulder (12) toward a nozzle tip (15) comprising a mold (20) including a female cavity and a male core cooperatively defining an injection cavity corresponding to the configuration of the nozzle cartridge, means for injecting hot melt into the injection cavity, first means for centering a tip (45) of the male core (29) against a centering portion (46) of the female cavity during the injection of the hot melt, second means for centering an annular shoulder (39) of the male core (29) against a centering portion (40) of the female cavity to substantially fill the injection cavity, and means for terminating the centering of the tip (45) and the annular shoulder (39) to effect total infusion of the injected hot melt into substantially the entirety of the injection cavity including areas created during centering termination.

11. The apparatus as defined in claim 10 wherein the terminating means is operative to effect relative axial movement between the female cavity and the male core.

12. The apparatus as defined in claim 10 wherein the terminating means is operative to effect relative axial movement between the female cavity and the male core by axially moving the male core.

13. The apparatus as defined in claim 10 wherein the injecting means injects the hot melt in a flow direction from a tip cavity portion of the female cavity toward the annular shoulder.

14. The apparatus as defined in claim 11 wherein the injecting means injects the hot melt in a flow direction from a tip cavity portion of the female cavity toward the annular shoulder.

15. The apparatus as defined in claim 12 wherein the injecting means injects the hot melt in a flow direction from a tip cavity portion of the female cavity toward the annular shoulder.

16. Apparatus for manufacturing a nozzle cartridge defined by a cylindrical body (10) ending at an annular shoulder (12) defining a transition area merging with a nozzle (14) tapering from the annular shoulder (12) toward a nozzle tip (15) comprising a mold (20) including a female cavity and a male core cooperatively defining an injection cavity corresponding to the configuration of the nozzle cartridge, means for injecting hot melt into the injection cavity at a tip cavity portion of the injection cavity, first means for centering a tip (45) of the male core (29) against a centering portion (46) of the female cavity during the injection of the hot melt, second means for a centering annular shoulder (39) of the male core (29) against a centering portion (40) of the female cavity to substantially fill the injection cavity, and means for terminating the centering of the tip (45) and the annular shoulder (39) to effect total infusion of the injected hot melt into substantially the entirety of the injection cavity including areas created during centering termination.

17. The apparatus as defined in claim 16 wherein the terminating means is operative to effect relative axial movement between the female cavity and the male core.

18. The apparatus as defined in claim 16 wherein the terminating means is operative to effect relative axial movement between the female cavity and the male core by axially moving the male core.

19. The apparatus as defined in claim 16 wherein the injecting means injects the hot melt in a flow direction from a tip cavity portion of the female cavity toward the annular shoulder.

20. The apparatus as defined in claim 17 wherein the injecting means injects the hot melt in a flow direction from a tip cavity portion of the female cavity toward the annular shoulder.

21. The apparatus as defined in claim 18 wherein the injecting means injects the hot melt in a flow direction from a tip cavity portion of the female cavity toward the annular shoulder.

* * * * *